United States Patent [19]

Beltz et al.

[11] 4,383,978
[45] May 17, 1983

[54] PROCESS OF OBTAINING URANIUM AND URANIUM COMPOUNDS FROM PHOSPHORIC ACID

[75] Inventors: Klaus Beltz, Budenheim; Klaus Frankenfeld, Huenfelden; Rainer Lehmann, Limeshain; Inge Zintl, Mainz-Finthen, all of Fed. Rep. of Germany

[73] Assignee: Chemische Fabrik Budenheim, Budenheim, Fed. Rep. of Germany

[21] Appl. No.: 218,032

[22] Filed: Dec. 19, 1980

[30] Foreign Application Priority Data

Dec. 27, 1979 [DE] Fed. Rep. of Germany ....... 2952475

[51] Int. Cl.³ .............................................. C01G 43/00
[52] U.S. Cl. .................................................. 423/9; 423/10
[58] Field of Search ........................................ 423/9, 10

[56] References Cited

U.S. PATENT DOCUMENTS

| | | | |
|---|---|---|---|
| 2,877,250 | 3/1959 | Brown et al. | 423/9 |
| 2,990,244 | 6/1961 | Brown et al. | 423/9 |
| 3,156,524 | 11/1964 | Drobnick et al. | 423/9 |
| 3,214,239 | 10/1965 | Hazen et al. | 23/14.5 |
| 3,227,576 | 1/1966 | Cole | 423/9 |
| 3,276,849 | 10/1966 | Moore | 423/9 |
| 3,409,415 | 11/1968 | Moore | 423/10 |
| 3,835,214 | 9/1974 | Hurst et al. | 423/9 |
| 3,966,872 | 6/1976 | Sundar | 423/10 |
| 4,105,741 | 8/1978 | Wiewiorowski | 423/10 |
| 4,252,777 | 2/1981 | McDowell | 423/9 |
| 4,275,037 | 6/1981 | Friedland | 423/9 |

FOREIGN PATENT DOCUMENTS

991418 5/1965 United Kingdom ................. 423/9

OTHER PUBLICATIONS

Crouse et al., "The Amex Process", Ind. and Eng. Chem. 51, No. 12, pp. 1461-1464, (1959).
Chem. Abstr., vol. 85, (1976), 131296d.
Chemical Abstract, vol. 90, (1979), p. 445.

Primary Examiner—Brian E. Hearn
Attorney, Agent, or Firm—Schwartz, Jeffery, Schwaab, Mack, Blumenthal & Koch

[57] ABSTRACT

The invention concerns a method for the liquid/liquid extraction of uranium from phosphoric acid with the aid of alkylamine polyphosphate and/or alkylamine metaphosphate compounds, dissolved in organic solvents insoluble in water, in the presence of $Fe^{II}$ ions.

The uraniferous phosphoric acid is brought into contact with an organic phase. The organic phase is composed of a long-chain alkylamine polyphosphate and/or alkylamine metaphosphate compound and an organic solvent, the alkylamine in the alkyl residue containing 8 to 30, preferably 8 to 18 C-atoms corresponding to the formula

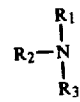

$R_1$ and $R_2$ denoting hydrogen or alkyl radicals and $R_3$ alkyl radicals, the polyphosphate and/or metaphosphate residue having 2 to 10,000 P-Atoms per molecule and being of the straight-chain and/or link-chain or cyclic type. The uranium is transferred from the aqueous into the organic phase from which the uranium is reextracted in the know way.

12 Claims, No Drawings

PROCESS OF OBTAINING URANIUM AND URANIUM COMPOUNDS FROM PHOSPHORIC ACID

BACKGROUND OF THE INVENTION

The invention concerns a method for the liquid/liquid extraction of uranium from phosphoric acid with the aid of alkylamine polyphosphate and/or alkylamine metaphosphate compounds, dissolved in organic solvents insoluble in water, in the presence of $Fe^{II}$ ions.

Mineral acids, among other things, are used for the dissolution of uraniferous ores, which contain the uranium in the dissolved state after the dissolution process. Many efforts have been made in order to remove the uranium from such acids in order to obtain uranium.

During the production of phosphoric acid according to the acid dissolution process, crude phosphoric acids also containing uranium are obtained when using uraniferous phosphate ores. Various methods of uranium extraction from phosphoric acids have become known, e.g., extraction of uranium with the aid of alkyl pyrophosphoric esters and extraction with di (2-ethyl hexyl) phosphoric acid and trioctyl phosphine oxide, the latter process having obtained special significance.

The uranium extraction from phosphoric acid did not have an exonomic significance for a long time, since the uranium concentration both in the phosphate ores and in the acids obtained was too small to be considered profitable.

Consequently, methods were mainly employed for uranium extraction, which process uranium ores of a higher concentration as raw materials. In such processes, among other things, the uranium is dissolved from the mineral and by treating the ore with dilute sulphuric acid, using an oxidizing agent if required, whereby the uranium is transferred into the sulphuric acid. The uranium is then separated from the diluted acid by other process steps.

One of these isolation methods is, for instance, the solvent extraction of the uranium with the aid of higher molecular weight alkylamines. In U.S. Pat. No. 2,877,250, for instance, a liquid/liquid extraction method is described to obtain uranium from aqueous acid solutions with amines, which are dissolved in water-in-soluble non-polar organic solvents. From this it can be seen that a good uranium extraction with amines is possible from such solutions which have a low to mediumconcentration of sulphate, phosphate, fluoride and acetate and a high concentration of chloride as well as a high concentration of nitrate with a medium pH-value. For instance, from a 0.7 molar phosphoric acid (approximately 4.8% $P_2O_5$), uranium is extracted to a certain extent according to the known method, while it is not possible any longer to extract uranium from a 1.3 molar phosphoric acid (approximately 8.6% $P_2O_5$). Similarly, according to the known method, the concentration of sulphuric acid must be less than 1 molar (approximately 9.4% $H_2SO_4$) in order to obtain quantities of uranium worth considering.

In addition to this, U.S. Pat. No. 3,409,415 describes a process of obtaining tri-valent lanthanides and actinides from solutions not containing a sulphate by means of organic acids, selected from the group of monocarboxyl, polycarboxyl and amine polycarboxyl acids, with the aid of water-immiscible organic solutions of high-molecular amines. The pH-value of the solutions from which the metal ions are extracted ranges from approximately 2.5 to 10.3.

From Chemical Abstracts, Vol. 85, 1976, 131296d it is known to extract uranium with primary amines in the presence of tetrasodium pyrophosphate. Such an extraction does not take place from a highly acidic solution, but from solutions with a pH-value of 5–7.

The processes of uranium extraction from phosphoric acid with the aid of alkyl pyrophosphoric esters and with di (2-ethyl hexyl) phosphoric acid and trioctyl phosphine oxide work in an acid concentration range of approximately 5.3 molar (i.e., approximately 30% $P_2O_5$).

However, these known methods have the disadvantage of a high chemical consumption due to the instability of the reagent if alkyl pyrophosphoric esters are used. When using di (2-ethyl hexyl) phosphoric acid and trioctyl phosphine oxide, the process, on the one hand, is subjected to high financial expenditures for the acquisition of the reagent, while, on the other hand, extensive process steps for the circulation of the light reagent phase are necessary in order to ensure the continuous operation of the total flow of the uranium extraction.

Consequently, there was a demand for a process suitable to extract uranium from acidic solutions with low to high acid concentration.

SUMMARY OF THE INVENTION

It is therefore an object of the present invention to provide an improved process for extracting uranium and uranium compounds from acid solution.

It is another object of the invention to provide a process for extracting uranium and uranium compounds from phosphoric acid solutions of high acid concentration and low concentrations of uranium.

In accomplishing the foregoing objects, there has been provided according to the present invention a process for obtaining uranium and uranium compounds from phosphoric acid, comprising the steps of contacting aqueous phosphoric acid containing uranium in the dissolved state with an amine selected from a long-chain alkylamine polyphosphate, an alkylamine metaphosphate compound or a mixture thereof dissolved in an organic solvent which is insoluble in water, wherein the alkyl portion of said alkylamine contains between 8 and 30 carbon atoms, preferably from 8 to 18 carbon atoms, and corresponds to the formula

wherein $R_1$ and $R_2$ denote hydrogen or alkyl and $R_3$ denotes alkyl, and wherein the polyphosphate or metaphosphate portion of the amine comprises from about 2 to 10,000 phosphorus atoms per molecule, with the contacting being carried out in the presence of an amount of $Fe^{II}$ ions sufficient to promote substantial transfer of uranium from the aqueous phase into the organic phase; and recovering the uranium from the organic phase. In one preferred embodiment, the process also includes the step of adding a reducing agent, whereby $Fe^{III}$ ions present in the phosphoric acid are transformed into $Fe^{II}$ ions.

Further objects, features and advantages of the present invention will become apparent from the detailed description of preferred embodiments which follows.

DETAILED DESCRIPTION OF PREFERRED EMBODIMENTS

With the present invention, a process has been developed to obtain uranium and uranium compounds from phosphoric acid with the aid of amines, dissolved in organic solvents insoluble in water, in the presence of complexing agents. The process is characterized by the fact that aqueous phosphoric acid, containing uranium in the dissolved state, is brought into contact with a long-chain alkylamine polyphosphate and/or alkylamine metaphosphate compound, dissolved in an organic solvent in the presence of $Fe^{II}$ ions, the alkylamine in the alkyl residue containing 8 to 30, preferably 8 to 18 C-atoms, corresponding to the formula

wherein $R_1$ and $R_2$ denote hydrogen or alkyl radicals and $R_3$ denotes an alkyl radical, the polyphosphate and/or metaphosphate residue having 2 to 10,000 P-atoms per molecule, either being of the straight-chain and/or a branched- or cross-linked chain or of the cyclic type. The uranium is transferred from the aqueous into the organic phase, from which the uranium is reextracted in the known way.

The literature states that the extraction of the uranium from acidic solutions with the aid of an alkylamine is disturbed or stopped by the presence of larger quantities of phosphate ions. For this reason, the alkylamines have not found use for the extraction of the uranium from phosphoric acid. With the wet dissolution process of the phosphate ores with sulphuric acid, the crude phosphoric acid solutions are usually obtained with a $P_2O_5$ content of 30%. This corresponds to a phosphoric acid concentration of 4.2 mol per kg of crude acid.

Surprisingly, it was now discovered that alkylamines in connection with polyphosphate and/or metaphosphate ions and in the presence of $Fe^{II}$ ions can be used as excellent reagents for the extraction of the uranium from phosphoric acid solutions. Besides Fe-ions, the phosphoric acid can also contain other cations without a restriction of the extraction effect.

The extraction of the uranium from phosphoric acids can be carried out in the concentration range of between about 0.1 and about 8 mol/kg of acid to be extracted (0.7% to about 57% $P_2O_5$), preferably between about 1 and about 6 mol/kg of acid to be extracted (7% to about 43% of $P_2O_5$). The upper concentration limit of the phosphoric acid is set by the viscosity of the acid and its influences on the practicability of the extraction.

Further, it was totally surprising to the experts that from phosphoric acids containing polyphosphate and/or metaphosphate the alkylamine selectively reacts only with the polyphosphate ions and/or metaphosphate ions, forming a compound which is soluble in organic solvents immiscible with water and phosphoric acid. This compound constitutes the effective reagent for uranium extraction. Consequently, it was surprising to experts that polyphosphate and/or metaphosphate ions in connection with alkylamine enable a good uranium extraction yield even from high-percentage phosphoric acids, while monophosphate ions prevent the uranium extraction in connection with alkylamines from acidic solutions already at concentrations of about >1 molar.

This produces a new technical, totally surprising factual situation.

Alkylamine polyphosphate and/or alkylamine metaphosphate can be formed during the extraction process in different ways. For instance, it is possible to dissolve an alkaline and/or ammonium salt of the polyphosphoric acid and/or metaphosphoric acid in the mineral acid to be treated, whereby the respective free polyphosphoric acid and/or metaphosphoric acid is formed, which is then absorbed by the added alkylamine in this way constituting the extraction agent. It is also possible to use the free polyphosphoric and/or metaphosphoric acid instead of a salt, such as is obtained for instance when evaporating orthophosphoric acid.

In addition to this, it is possible to separately produce the polyphosphoric acid and/or metaphosphoric acid by treating an aqueous alkali and/or ammonium polyphosphate and/or metaphosphate solution with a cation exchanger resin, and to direct the eluate directly into the organic solution of alkylamine and solvent. Thus, phases are formed in this way, the polyphosphoric acid and/or metaphosphoric acid migrating to the organic phase and forming the effective compound with the alkylamine. The heavy phase consists of an aqueous solution of surplus polyphosphoric acid and/or metaphosphoric acid, which is isolated. This method is particularly advantageous for a subsequent continuous countercurrent extraction process.

Both primary and secondary, as well as tertiary amines can be used as alkylamines with the process according to the invention. Mixtures of amines can also be employed.

Some amines, however, may be subject to a limitation with respect to the usability for the extraction of the uranium from phosphoric acid, since they can form a third phase as amine polyphosphate and/or amine metaphosphate compound during the extraction so that a regular course of the claimed method is advisable only when making use of additional measures.

The formation of a third phase can be prevented if other organic substances with solubilizing properties such as n-octanol, iso-decanol, reaction mixtures from the oxysynthesis in the range from $C_8$ to $C_{12}$, cyclohexanone or tridecanol are added to the organic phase of amine polyphosphate and/or amine metaphosphate and organic solvent. Difficulties during the extraction itself do not occur as a result of this. In a continuous process flow with reextraction of the uranium and recovery of the solvent, however, the addition of a solubilizer represents a considerable complication as a result of the change of the distribution equilibriums between the phases.

The amines suitable for the process according to the invention should additionally be immiscible with water and phosphoric acid. An amine loss and a contamination of the aqueous mineral-acidic phase with amine occurs with a high solubility of the amine. The solubility of the amines in water and phosphoric acid should be <1%.

The following table shows the solubility in water of the various amines at 20° C.:

| Amines: | (1) Isononylamine |
|---|---|

| | -continued | | | | | | | |
|---|---|---|---|---|---|---|---|---|
| | (2) Isotridecylamine | | | | | | | |
| | (3) Di-sec.-butylamine | | | | | | | |
| | (4) Tri-n-octylamine | | | | | | | |
| | (5) Tri-iso-octylamine | | | | | | | |
| | (6) Tri-iso-nonylamine | | | | | | | |
| | (7) Tri-iso-decylamine | | | | | | | |
| | (8) Tri-dodecylamine | | | | | | | |
| AMINE | 1 | 2 | 3 | 4 | 5 | 6 | 7 | 8 |
| (1) Solubility of the amines in $H_2O$ (%) | 0.2 | 0.1 | 0.7 | 0.04 | 0.1 | 0.3 | 0.005 | 0.1 |

With the practical performance of the process according to the invention, the behavior of the amine-organic solvent and the amine polyphosphate and/or amine metaphosphate - organic solvent system with respect to the aqueous phase is significant for the selection of the useful amine.

The primary, secondary and tertiary amines with a carbon atom number in the alkyl residue of 8 to 30, especially between 8 and 18, can be used in the process according to the invention. Especially useful are, for instance, the long-chain amines, iso-tridecylamine, tri-iso-octylamine, tri-iso-decylamine, tri-dodecylamine, di-laurylamine and di-iso-octadecylamine. Not only the pure amines but also technical amine mixtures are useful.

The amines are highly viscous substances and therefore difficult to handle in the extraction process according to the invention. Practically the amines are therefore dissolved in organic solvents. These organic solvents must meet the following requirements: They must not be miscible with water and phosphoric acid or absorb water and phosphoric acid. These conditions for the organic solvent apply accordingly also to the aqueous alkaline phase during the reextraction of the uranium from the organic phase.

Moreover, the organic solvents must have a good solubility for the amines and the amine polyphosphates and/or or amine metaphosphates and the extracted uranium, but may not themselves react with those.

The following groups have proved particularly useful as solvents for the process according to the invention:

(a) Aliphatic and aromatic hydrocarbons in the form of defined compounds, mixtures of distillation fractions, (b) chlorinated hydrocarbons, (c) ethers, ketones, esters, as far as they meet the above-mentioned conditions.

The following substances have proved useful as polyphosphate and/or metaphosphate components for the production of the amine polyphosphates and/or amine metaphosphates.

Di-phosphoric acid
Tri-phosphoric acid
Tetra-phosphoric acid
Medium-to long-chain polyphosphoric acids
Branched-chain or cross-lined chain polyphosphoric acids produced from Kurrol salt
Tri-metaphosphoric acid
Tetra-metaphosphoric acid and the mixtures thereof, as they are obtained for instance during concentrating of monophosphoric acid.

These poly- and/or metaphosphoric acids form compounds with the described amines which are soluble in the described solvents and constitute the extraction agent for the process according to the invention.

The extraction effect of the individual alkylamine polyphosphates and/or alkylamine metaphosphates for uranium from phosphoric acid differs.

The different extraction effect of the individual polyphosphate and/or metaphosphate amine compounds is shown with the example of a precleaned North African crude phosphoric acid with 30% $P_2O_5$. This precleaned crude phosphoric acid has the following composition relating to 100% $P_2O_5$:

| U | 0.035% |
|---|---|
| Mg | 1.51% |
| Ca | 0.46% |
| Fe | 0.56% |
| Al | 0.60% |
| Cr | 0.075% |
| V | 0.062% |
| Ti | 0.019% |

The following table shows the test results which were gained with a single-stage extraction of the above mentioned crude phosphoric acid with the various alkylamine polyphosphate and/or alkylamine metaphosphate compounds under comparable conditions.

| | Alkylamine | Extracted U-quantity % of quantity employed |
|---|---|---|
| (1) | Without polyphosphate | 3 |
| (2) | Diphosphoric acid | 12 |
| (3) | triphosphoric acid | 62 |
| (4) | Tetrapolyphosphoric acid | 88 |
| (5) | Long-chain polyphosphoric acid | 92 |
| (6) | Link-chain polyphosphoric acid | 85 |
| (7) | Mixture of (5) and (6) in the ratio 1:1 | 94 |
| (8) | Trimetaphosphoric acid | 32 |

From the results it can be seen that those amine polyphosphate compounds are best suitable for the extraction of uranium from phosphoric acid, which contain a long-chain and/or linked-chain polyphosphate ion.

The concentration of the phosphoric acid has also a certain influence on the extractability of the uranium according to the invented process, but, in principle, this does not restrict the practicability of the process according to the invention.

The following test series gives a general view both of the influence of the $P_2O_5$ concentration and of the different types of acid. The following crude acids in the concentration range of 10–50% $P_2O_5$ were employed for this test series:

(1) Crude acid from Togo phosphate ore:
0.029% U / 100% $P_2O_5$
1.96% Fe / 100% $P_2O_5$ (2) Crude acid from Morocco phosphate ore:
0.035% U / 100% $P_2O_5$
0.56% Fe / 100% $P_2O_5$ (3) Crude acid from Florida phosphate ore:
0.042% U / 100% $P_2O_5$
2.3% Fe / 100% $P_2O_5$ An alkylamine polyphosphate was used as extraction agent, the polyphosphate residue of which had a polymerization degree of n=30. The extraction tests were carried out in single stages in the phase ratio (weight ratio) of 1:1 at 20° C.

The results are listed in the following table:

| Acid Concen- | Crude phosphoric acid | | |
|---|---|---|---|
| tration | Togo | Morocco | Florida |
| % $P_2O_5$ | Extracted uranium quantity % of quantity employed | | |
| 10 | 60 | 39 | 58 |
| 20 | 89 | 85 | 82 |
| 25 | 76 | 76 | 91 |
| 30 | 84 | 92 | 90 |
| 35 | 74 | 73 | 64 |
| 40 | 63 | 63 | 25 |
| 45 | 46 | 26 | 6 |
| 50 | 25 | 8 | 3 |

The extractability of the uranium from the different crude phosphoric acids differs. The cause discovered for this was the different type and quantity of the foreign cations contained in the various acids.

The influence of the various foreign cations on the extractability of the uranium from phosphoric acid in a pure acid system using an amine polyphosphate with 30 P-atoms is represented as follows:

| Type | Foreign cations Concentration | Extracted U-quantity % of quantity employed |
|---|---|---|
| Without | — | 74 |
| Na | 0.5 | 75 |
| K | 0.5 | 85 |
| Mg | 0.5 | 30 |
| Ca | 0.5 | 11 |
| Al | 0.5 | 12 |
| $Fe^{II}$ | 0.5 | 95 |
| $Fe^{III}$ | 0.5 | 9 |
| $Cr^{III}$ | 0.5 | 35 |
| $Cu^{II}$ | 0.5 | 38 |
| Zn | 0.5 | 50 |
| $Mn^{II}$ | 0.5 | 34 |
| $Ti^{IV}$ | 0.1 | 11 |

The presence of iron II ions produces the best extraction effect for the uranium.

The negative influence of the foreign cations on the extractability of uranium from phosphoric acid can be compensated in all cases by adding $Fe^{II}$ ions, as shown in the following table:

| Foreign cations | | Addition of | Extracted quantity of uranium in % of |
|---|---|---|---|
| Type | Concentration | $Fe^{II}$ in % | the quantity employed |
| Without | — | 0.5 | 95 |
| Na | 0.5 | 0.5 | 97 |
| K | 0.5 | 0.5 | 97 |
| Mg | 0.5 | 0.5 | 97 |
| Ca | 0.5 | 0.5 | 97 |
| Al | 0.5 | 0.5 | 97 |
| $Cr^{III}$ | 0.5 | 0.5 | 97 |
| $Cu^{II}$ | 0.5 | 0.5 | 97 |
| Zn | 0.5 | 0.5 | 97 |
| $Mn^{II}$ | 0.5 | 0.5 | 97 |
| $Ti^{IV}$ | 0.1 | 0.5 | 95 |

The improvement of the extractability of uranium from phosphoric acid by adding $Fe^{II}$ ions is achieved when using the various amine polyphosphates and/or amine metaphosphates as extracton agent, as can be seen from the following table:

| Amine polyphosphates | Extracted U-quantity Without $Fe^{II}$ ions | (% of quantity employed) Addition of 0.5% $Fe^{II}$ ions |
|---|---|---|
| (1) — | 4 | 9 |
| (2) Diphosphate | 10 | 25 |
| (3) Triphosphate | 29 | 75 |
| (4) Trimetaphosphate | 12 | 25 |
| (5) Tetraphosphate | 35 | 94 |
| (6) Long-chain polyphosphate | 74 | 98 |
| (7) Linked-chain polyphosphate | 64 | 98 |
| (8) Mixture of numbers 6 and 7 1:1 | 72 | 98 |

It showed that a certain quantity of Fe II ions with relation to the uranium quantity present in the phosphoric acid is necessary in order to achieve an optimum extraction of the uranium from the phosphoric acid.

The influence of the Fe II ion quantity on the extractability of the uranium from a uraniferous, pure phosphoric acid with 30% $P_2O_5$ can be seen from the following table for various uranium contents in the phosphoric acid, with a single-stage extraction in the phase ratio of 1:1 (parts by weight) with a 2.5% tridodecylamine polyphosphate kerosene solution:

| U-quantity in the phosphoric acid (ppm) | 200 | | | 500 | | | 1000 | | |
|---|---|---|---|---|---|---|---|---|---|
| Addition of $Fe^{II}$ ions (%), with relation to the phosphoric acid | 0.01 | 0.02 | 0.04 | 0.025 | 0.005 | 0.10 | 0.05 | 0.10 | 0.20 |
| Extracted U-quantity (% of quantity employed) | 62 | 77 | 82 | 65 | 75 | 98 | 62 | 94 | 96 |

In order to achieve an optimum uranium depletion, the process according to the invention requires an adequately great quantity of $Fe^{II}$ ions which, with a single-stage equal phase extraction, should have at least the same quantity by weight as the uranium present in the phosphoric acid. When changing the extraction conditions, the $Fe^{II}$ ion requirement may shift to greater or smaller quantities.

It is not known whether the iron present in the various crude phosphoric acids is of the bi-valent or the trivalent type.

If the iron present in the crude phosphoric acids is purposefully transformed into the tri-valent form and the extraction of the uranium is carried out with amine polyphosphate, the extraction result deteriorates severely.

When adding reducing agents in adequate quantity to transform the $Fe^{III}$ ions present in the crude acids into the bi-valent form, however, a very good extraction result is obtained.

For the individual typical crude phosphoric acids, the influence of the valency of the iron on the extraction of the uranium with alkylamine polyphosphate with the various acid concentrations can be represented as follows:

| Crude phosphoric acid from Togo | | | |
|---|---|---|---|
| Acid concentration % $P_2O_5$ | Original form | with $Fe^{III}$ ions | with $Fe^{II}$ ions |
| | Extracted U-quantity (% of quantity employed) | | |
| 10 | 60 | 37 | 97 |
| 20 | 89 | 22 | 88 |
| 25 | 76 | 13 | 88 |
| 30 | 84 | 5 | 95 |
| 35 | 74 | 6 | 82 |
| 40 | 63 | 3 | 70 |
| 45 | 46 | 3 | 47 |
| 50 | 25 | 6 | 25 |

| Crude acid from Morocco | | | |
|---|---|---|---|
| Acid concentration % $P_2O_5$ | Original form | with $Fe^{III}$ ions | with $Fe^{II}$ ions |
| | Extracted U-quantity (% of quantity employed) | | |
| 10 | 39 | 37 | 98 |
| 20 | 85 | 24 | 98 |
| 25 | 76 | 15 | 98 |
| 30 | 92 | 13 | 95 |
| 35 | 73 | 8 | 75 |
| 40 | 63 | 4 | 68 |
| 45 | 26 | 2 | 29 |
| 50 | 8 | 2 | 9 |

| Crude acid from Florida | | | |
|---|---|---|---|
| Acid concentration % $P_2O_5$ | Original form | with $Fe^{III}$ ions | with $Fe^{II}$ ions |
| | Extracted U-quantity (% of quantity employed) | | |
| 10 | 58 | 41 | 98 |
| 20 | 82 | 25 | 88 |
| 25 | 91 | 11 | 97 |
| 30 | 90 | 16 | 96 |
| 35 | 64 | 11 | 65 |
| 40 | 25 | 13 | 30 |
| 45 | 6 | 8 | 10 |
| 50 | 3 | 2 | 4 |

The extraction of the uranium with alkylamine polyphosphates and/or alkylamine metaphosphates from phosphoric acid, which, besides uranium, also contain other cations in the dissolved state, is significantly improved by the presence of $Fe^{II}$ ions.

The claimed process must each time be adapted to the type of phosphoric acid from which the uranium is to be extracted. The process can be varied by various concentrations of the amine in the organic phase, by different phase ratio of organic to inorganic phase, as well as by the number of extraction stages and the quantity of $Fe^{II}$ ions in the phosphoric acid.

It was discovered that it is advantageous to keep the amine concentration in the solvent within the limits of 0.1–10% by weight. The phase ratio of organic to inorganic phase is also no critical quantity and can fluctuate within the limits of for instance 1:4 to 4:1, while these limits can be exceeded to both sides at any time.

In practice, the extraction process according to the invention is operated as a multi-stage countercurrent extraction process. The number of stages required depends on the type of alkylamine polyphosphate and/or alkylamine metaphosphate used and on the concentration and type of the phosphoric acid. Practical tests have shown that 3–8 extraction stages are adequate in order to achieve a complete extraction of the uranium.

If uranium is to be extracted from crude phosphoric acids having a high content of organic substances, the organic substances should be minimized in a prearranged cleaning process for instance by treating the acid with adsorption agents such as activated charcoal or decolorants, or by treating with immiscible organic solvents such as diesel fuel, since the organic substances will otherwise easily give rise to emulsification, thereby seriously affecting the extraction process.

The alkylamine polyphosphates and/or alkylamine metaphosphates employed with the process according to the invention are high-molecular substances the molecular weight of which ranges from about 300 to about 4,300,000, preferably from 1,00 to 70,000. When using a long-chain polyphosphric acid with a polymerization degree of $n=30$ and an amine of 36 C-atoms, compounds are obtained with a molecular weight of about 13,000, the molar N : P ratio being about 1:1. If other basic substances are selected to form the extraction agent within the scope of the process according to the invention, the molar N : P ratio will fluctuate within the limits from 1:2 to 2:1.

The extractio agents can be formed in different ways, i.e., the polyphosphate and/or metaphosphate ions can firstly be added to the uraniferous phosphoric acid in form of salts or as free acids. The required alkylamine is added to the extraction system dissolved in a water-insoluble organic solvent. The dissolved amine absorbs the polyphosphate and/or metaphosphate ions from the inorganic phase, forming the extraction agent at the same time. With the extraction agent, the uranium is transferred from the inorganic phase into the organic phase. From the organic phase the uranium is reextracted in the known way.

Secondly, it is possible to produce the extraction agent in a separate process step.

This method is practical if the process according to the invention is operated as a continuous countercurrent extraction process. In this case the amine, dissolved in a water-insoluble organic solvent, is made to react with free poly-and/or metaphosphoric acid. The free poly-and/or metaphosphoric acid can be added either as dilute aqueous solution or in highly concentrated form. It can be produced for instance by ion exchange from the polyphosphate and/or metaphosphate salt solutions.

Two separate liquid phases are formed in this way. The organic phase consists of the organic solvent and the formed alkylamine polyphosphate and/or alkylamine metaphosphate.

The aqueous phase contains, where applicable, the excess of free poly-and/or metaphosphoric acid. The aqueous phase is isolated.

In the known extraction apparatuses, the organic phase, consisting of alkylamine polyphosphate and/or alkylamine metaphosphate, dissolved in an organic solvent, is brought into contact with the uraniferous phosphoric acid, constituting the inorganic phase. The uranium is absorbed by the organic phase.

It is also possible to add the pure amine polyphosphate and/or amine metaphosphate compound to the organic solvent and to use it in this form with the process according to the invention.

The phosphoric acid liberated of uranium neither contains amine nor organic solvent, since these do not migrate into the aqueous phase. The phosphoric acid can be used as such, or to further process their salts, or be transferred to more extensive cleaning processes.

The process according to the invention is usually carried out at room temperature. It can also be operated at other temperatures, the lower limits being set by the increase of the viscosity in the phases and the upper limits by the boiling point of the organic solvent.

The uraniferous organic phase is treated with an aqueous alkaline reacting solution. In this way the extraction agent is split into the two components. The alkali polyphosphate and/or alkali metaphosphate and the uranium formed in this process migrate into the aqueous alkaline phase. The alkylamine remains as free base in the organic phase. The latter is again subjected to the extraction process for the uranium separation from the phosphoric acid. From the aqueous alkaline phase the uranium is separated in the known way.

The process step of reextracting the uranium from the organic phase in the aqueous alkaline phase can be carried out in charges, in several single stages, or as countercurrent extraction.

EXAMPLE 1

A sizable quantity of crude phosphoric acid, which was produced from Moroccan phosphate ore according to the wet process, was freed both of solids and organic contaminations by long-term decantation and activated charcoal treatment. The obtained clean green crude acid contained:

29.9% $P_2O_5$
1.4% $H_2SO_4$
1.6% HF
0.16% Fe
0.0135% U

From this crude phosphoric acid supply, a continuous four-stage liquid/liquid countercurrent extraction was conducted over a period of 45 days in order to remove the uranium from the phosphoric acid. The extraction system consisted of a series-arranged mixer-settler arrangement.

The countercurrent extraction system was fed with a crude acid quantity of 2.9 kg/h from a receiver tank. The acid of the receiver tank was mixed with 0.18% $Na_2SO_3$ beforehand, in order to transform the existing iron of the crude acid into the bi-valent form. The countercurrent extraction system was operated in the phase ratio of 1:3 parts by weight of organic phase to inorganic phase.

The fed-in quantity of organic phase was 0.97 kg/h. It had the following composition:
97.8% naphtha fuel, boiling point 140° C.
2.2% tridodecylamine polyphosphate.

The organic phase was continuously produced in a separate mixer-settler apparatus, by converting the return flow of the solvent-tridodecylamine mixture circulating in the process with an excess quantity of a continuously produced aqueous solution of long-chain polyphosphoric acid of about 30 P links, the aqueous solution of the long-chain polyphosphoric acid having been obtained in the H+ form by treating a dilute sodium polyphosphate solution with a highly acidic ion exchanger. Two phases were thus obtained, the aqueous phase of which contained the excess polyphosphoric acid; this phase was separated.

The depletion of the uranium from the crude phsophoric acid took place in the course of the four-stage countercurrent extraction. After the individual extraction stages, the following U-concentration was obtained in the crude phosphoric acid:

| Supply crude acid | 0.0135% |
| After 1st extraction stage | 0.0032% |
| After 2nd extraction stage | 0.0006% |
| After 3rd extraction stage | 0.0002% |
| After 4th extraction stage | <0.0002 |

The concentration of the uranium-free crude phosphoric acid discharged from the countercurrent extraction was unchanged. A contamination of the crude acid with the solvent or alkylamine could not be established. The crude phosphoric acid was further processed for other products. The yield of extracted uranium from the crude phosphoric acid ws 99%.

The organic phase discharged from the phosphoric acid countercurrent extraction system was fed into a second countercurrent extraction system where it was treated with an aqueous 5% $Na_2CO_3$ solution. The second extraction system was operated in three stages. The phase ratio was 4:1 parts by weight of organic phase to inorganic phase.

The quantities fed into the countercurrent extraction were:
Organic phase—0.970 kg/h
Inorganic phase—0.242 kg/h
The quantities discharged from the extraction were:
Organic phase—0.966 kg/h
Inorganic phase—0.246 kg/h During the extraction process, a decomposition took place of the tridodecylamine polyphosphate compound into the free base, which remains in the organic phase, and the polyphosphate ions, which together with uranium migrated into the aqueous soda phase.

During the performance of the countercurrent extraction, the following uranium levels were obtained in the aqueous soda phases of the individual stages, the uraniferous organic phase being supplied to the extraction stage 1 and the inorganic soda phase to the extraction stage 3:
After 1st extraction stage—0.158%
After 2nd extraction stage—0.0015%
After 3rd extraction stage—0.0002%
The discharged filtered soda phase contained 0.186% $U_3O_8$.

This was further processed into uranium concentrate by precipitation with NaOH.

EXAMPLE 2

A crude phosphoric acid which was produced from Togo phosphate ore according to the wet process, was freed both of the solids and of organic contaminations by means of a cleaning process. The obtained clean green crude acid contained:

31.4% $P_2O_5$
1.2% $H_2SO_4$
0.6% HF
0.64% Fe
0.0092% U

A continuous eight-stage liquid/liquid countercurrent extraction was conducted over a period of 10 days in order to remove the uranium from the phosphoric acid. The extraction system consisted of a series-arranged mixer-settler arrangement.

The countercurrent extraction system was fed with a crude acid quantity of 3.2 kg/h from a receiver tank. The acid of the receiver tank was mixed with 0.72% $Na_2SO_3$ beforehand in order to transform the iron present in the crude acid into the bi-valent form. The countercurrent extraction system was operated in the phase ratio of 1:3 (parts by weight) of organic phase to inorganic phase.

The fed-in quantity of organic phase was 1.07 kg/h. I had the following composition:

97.8% kerosene; Boiling point 250°–300° C.

2.2% tridodecylamine trimetaphosphate.

The organic phase was continuously produced in a separate mixer-settler apparatus, by converting the return flow of the solvent-tridodecylamine mixture circulating in the process with an excess quantity of a continuously produced aqueous solution of trimetaphosphoric acid, the aqueous solution of the trimetaphosphoric acid having been obtained in the H+ form by treating a dilute sodium trimetaphsophate solution with a highly acidic ion exchanger. Two phases were formed, the aqueous phase containing the excess trimetaphosphoric acid; this phase was separated.

The depletion of the uranium from the crude phosphoric acid took place in the course of the eight-stage countercurrent extraction. After the individual extraction stages, the following U-concentrations were obtained in the crude phosphoric acid:

| | |
|---|---|
| Supply crude phosphoric acid | 0.0092% |
| After 1st extraction stage | 0.0060% |
| After 2nd extraction stage | 0.0040% |
| After 3rd extraction stage | 0.0025% |
| After 4th extraction stage | 0.0017% |
| After 5th extraction stage | 0.0011% |
| After 6th extraction stage | 0.0007% |
| After 7th extraction stage | 0.0005% |
| After 8th extraction stage | 0.0003% |

The concentration of the crude phosphoric acid discharged from the countercurrent extraction was unchanged. A contamination of the crude acid with the solvent or alkylamine could not be established. The crude phosphoric acid was further processed for other products. The yield of extracted uranium from the crude phosphoric acid amounted to 97%.

The organic phase discharged from the phosphoric acid countercurrent extraction system was fed into a second countercurrent extraction system where it was treated with an aqueous 5% $Na_2CO_3$ solution. The second extraction system was operated in three stages. The phase ratio was 5:1 (parts by weight) of organic phase to inorganic phase.

The quantities fed into the countercurrent extraction were:

Organic phase—1.07 kg/h
Inorganic phase—0;214 kg/h.

The quantities discharged from the extraction were:
Organic phase—1.03 kg/h
Inorganic phase—0.218 kg/h.

During the extraction process, a decomposition took place into the tridodecylamine trimetaphosphate compound into the free base, which remained in the organic phase, and into the trimetaphosphate anions, which, together with the uranium, migrated into the aqueous soda phase.

During the performance of the countercurrent extraction, the following uranium levels were obtained in the aqueous soda phases of the individual extraction stages, the uraniferous organic phase being fed into the extraction stage 1 and the inorganic soda phase being fed into the extraction stage 3:

After 1st extraction stage—0.135%
After 2nd extraction stage—0.0012%
After 3rd extraction stage—0.0002%

The discharged filtered soda phase contained 0.158% $U_3O_8$

This was further processed into uranium concentrate by precipitation with NaOH.

EXAMPLE 3

A crude phosphoric acid, which was produced from roasted Florida phosphates according to the wet fusion process and which was freed of solids by means of filtration, contained 25.0% $P_2O_5$
1.9% $H_2SO_4$
1.7% HF
0.7% Fe
0.012% U This phosphoric acid was depleted in charges of the uranium present by means of a single-stage liquid/liquid extraction.

The organic solvent used had the following composition:

96.0% petroleum ether; Boiling point 70° C.
2.0% octanol
2.0% tri-isodecylamine 100 kg of the phosphoric acid solution were filled into a closed extraction vessel with agitator and mixed with a solid, finely pulverized salt mixture and dissolved in the acid with the agitator operating. The salt mixture consisted of 0.79 kg $Na_2SO_3$
0.35 kg Kurrol salt $(KPO_3)_n$
0.35 kg long-chain polyphosphate $(NaPO_3)_n$.

After the dissolution of the salt mixture, the phosphoric acid was immediately mixed with 100 kg of the solvent mixture and intensively agitated for 15 minutes. After this the agitator was stopped and the phases were separated. The heavy phosphoric acid phase was transferred into a collection tank and later processed into other phosphoric acid products. The extracted phosphoric acid still contained 4 ppm of uranium as against 120 ppm in the employed acid. This corresponds to a yield of 97%.

The uraniferous solvent phase was also fed into a collection tank from where it was treated with a 10% aqueous soda lye in a three-stage countercurrent extraction system. The alkylamine remained as free base in the organic solvent. The polyphosphate ion migrated together with the uranium into the aqueous soda lye phase, the uranium being precipitated as yellow uranium oxide.

The countercurrent extraction was carried out in three stages in the phase ratio of 1:10 of aqueous NaOH phase/organic phase (parts by weight).

After the discharge from the countercurrent extraction, the organic phase was checked for its composition, readjusted and again used as solvent in the single-stage phosphoric acid extraction.

The precipitated uranium oxide was isolated from the aqueous NaOH solution by means of filtration. After readjusting the NaOH content, it was possible to reuse the NaOH filtrate in a second extraction cycle in the countercurrent extraction.

The filter cake obtained was washed and dried at 200° C.

A product was obtained, the $U_3O_8$ content of which amounted to 70.8%.

EXAMPLE 4

During a leaching process of a uraniferous material with dilute pure phosphoric acid, a filtered uraniferous phosphoric solution was obtained with
15.2% $P_2O_5$
0.185% U
0.1% Ca
0.1% Mg
0.03% Fe.

This phosphoric acid solution was mixed with that amount of a 10% aqueous solution of $FeSO_4$ that produced a $Fe^{II}$ content in the phosphoric acid solution of 0.3%.

The uraniferous phosphoric acid was extracted countercurrently with an organic solvent phase in a series-arranged three-stage mixer-settler extraction apparatus.

The organic phase had the composition
80.2% cyclohexane
10.0% isodecanol
9.8% dilaurylamine tetrapolyphosphate The countercurrent extraction of the phosphoric acid solution was carried out in the phase ration of 1:3 (parts by weight) of organic phase to inorganic phase.

The fed-in quantities were:
Inorganic phase—3.0 kg/h
Organic phase—1.0 kg/h

The holding times of the phases in the individual mixer-settler stages were:
Mixer—20 minutes
Settler—50 minutes.

The working temperature was around 30° C.

The organic phase was continuously produced in a separate mixer-settler apparatus, by converting the returning readjusted solvent flow with the free amine base with an excess quantity of tetrapolyphosphoric acid, the free polyphosphoric acid having been produced by an ion exchange process. Two phases were thus formed, the aqueous phase of which contained the excess tetrapolyphosphoric acid; this phase was isolated.

The phosphoric acid discharged from the countercurrent extraction apparatus had a residual uranium content of 0.0015%. The yield of the extracted uranium was 99%. The phosphoric acid depleted of uranium was further processed in the fertilizer sector.

The organic phase discharged from the countercurrent extraction contained the extracted uranium and the extraction agent. It was fed into a second three-stage countercurrent extraction system where it was reextracted with an aqueous solution with 15% $NH_4HCO_3$ and 3.5% $NH_3$. The reextraction apparatus is operated in the phase ratio of 4:1 (parts by weight) of organic phase to inorganic phase. The dilaurylamine tetrapolyphosphate compound was decomposed during the reextraction process. The amine remained as free base in the organic solvent phase and was again converted with an aqueous tetrapolyphosphoric acid solution.

The discharged inorganic phase had a uranium content of 2.05% after the filtration. By adding further $NH_3$ quantities, the dissolved uranium was precipitated as ammonium uranyl tricarbonate, filtered and converted into $U_3O_8$ at 1000° C.

EXAMPLE 5

The phosphoric acid solution obtained as by-product during a chemical-technical process was enriched with uranium and contained
42.2% $P_2O_5$
2.2% $H_2SO_4$
0.36% HF
0.54% Fe
0.0715% U.

300 kg of the phosphoric acid solution were filled into a closed vessel with agitator and mixed with 5.5 kg of solid sodium sulphite. Agitating lightly, the salt was dissolved in the acid. The agitating vessel served as acid receiver tank for the operation of the extraction apparatus.

Starting out from this phosphoric acid supply, a continuous six-stage liquid/liquid countercurrent extraction was conducted over a period of 4 days in order to remove the uranium. The extraction system consisted of a series-arranged mixer-settler arrangement.

The countercurrent extraction system was fed with an acid quantity of 2.9 kg/h. The countercurrent extraction system was operated in the phase ratio of 1:3 (parts by weight) of organic phase to inorganic phase.

The fed in quantity of organic phase was 0.97 kg/h. It had the following composition:
90.5% cyclohexane
5.0% isodecanol
4.5% isotridecylamine polyphosphate The organic phase was taken from a supply tank.

The phosphoric acid discharged from the countercurrent extraction apparatus had a residual uranium content of 0.0015%. The yield of extracted uranium amounted to 98%. The phosphoric acid depleted of uranium was further processed in the fertilizer sector.

The organic phase discharged from the countercurrent extraction contained the extracted uranium and the extraction agent. It was fed into a second three-stage countercurrent extraction system where it was reextracted with an aqueous 10% NaOH solution. The reextraction apparatus was operated in the phase ratio of 4:1 (parts by weight) of organic phase to inorganic phase. During the reextraction process, the isotridecylamine polyphosphate compound was decomposed. The amine remained as free base in the organic solvent phase. The amine solvent phase was collected in a separate storage tank.

The precipitated uranium oxide was isolated from the aqueous NaOH solution by means of filtration. After readjusting the NaOH content, it was possible to reuse the NaOH filtrate in a second extraction cycle in the countercurrent extraction.

The filter cake obtained was washed and dried at 200° C.

What is claimed is:

1. A process for obtaining uranium and uranium compounds from phosphoric acid, comprising the steps of:
   contacting aqueous phosphoric acid containing uranium in the dissolved state with an amine selected from a long-chain alkylamine polyphosphate, an alkylamine metaphosphate compound or a mixture thereof dissolved in an organic solvent which is insoluble in water, wherein the alkyl portion of said alkylamine contains between about 8 and 30 carbon atoms and corresponds to the formula

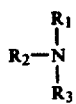

wherein $R_1$ and $R_2$ denote hydrogen or alkyl and $R_3$ denotes alkyl, and wherein the polyphosphate or metaphosphate portion of said amine comprises from about 2 to 10,000 phosphorus atoms per molecule, said contacting being carried out in the presence of an amount of $Fe^{II}$ ions sufficient to promote substantial transfer of uranium from the aqueous phase into the organic phase; and recovering the uranium from the organic phase.

2. A process as defined by claim 1, further comprising the step of adding a reducing agent to said uranium-containing phosphoric acid for reducing $Fe^{III}$ ions to $Fe^{II}$ ions.

3. A process as defined by claim 1, further comprising the step of removing substantially all organic contaminants from said uranium-containing phosphoric acid.

4. A process as defined by claim 1, wherein said step of recovering uranium comprises re-extracting uranium from the organic phase.

5. A process as defined by claim 1, wherein said amine comprises a straight chain, linked chain or a cyclic alkylamine compound.

6. A process as defined by claim 1, wherein said alkyl portion contains from about 8 to 18 carbon atoms.

7. A process as defined by claim 1, wherein said phosphoric acid has a concentration between about 0.1 and 8 mol/kg of acid corresponding to a $P_2O_5$ content of from about 0.7 to about 57%.

8. A process as defined by claim 1, wherein said amine is selected from
(1) isononylamine
(2) isotridecylamine
(3) di-sec.-butylamine
(4) tri-n-octylamine
(5) tri-iso-octylamine
(6) tri-iso-nonylamine
(7) tri-iso-decylamine
(8) tri-dodecylamine 9. A process as defined by claim 1, wherein said organic solvent is selected from chlorinated and non-chlorinated aliphatic and aromatic hydrocarbons, ethers, ketones or esters.

10. A process as defined by claim 1, wherein the alkylamine polyphosphate and/or alkylamine metaphosphate are produced by dissolving polyphosphate and/or metaphosphate ions in the phosphonic acid and by extracting the polyphosphate and/or metaphosphate ions in the organic phase by bringing the aqueous phase into contact with an organic phase consisting of long-chain amine, dissolved in an organic solvent.

11. A process as defined by claim 1, wherein the phosphoric acid used to obtain uranium and uranium compounds as treated with a solution comprising alkylamine polyphosphate and/or alkylamine metaphosphate in an organic solvent.

12. A process as defined by claim 1, wherein the alkylamine or alkylamine polyphosphate and/or alkylamine metaphosphate are dissolved in an organic solvent and the solution obtained is immersable with water and/or phosphoric acid.

* * * * *